Dec. 15, 1936.  G. H. HUTAFF, JR., ET AL  2,063,929
MIRRORED ELECTRIC LIGHT TUBING
Filed June 28, 1935
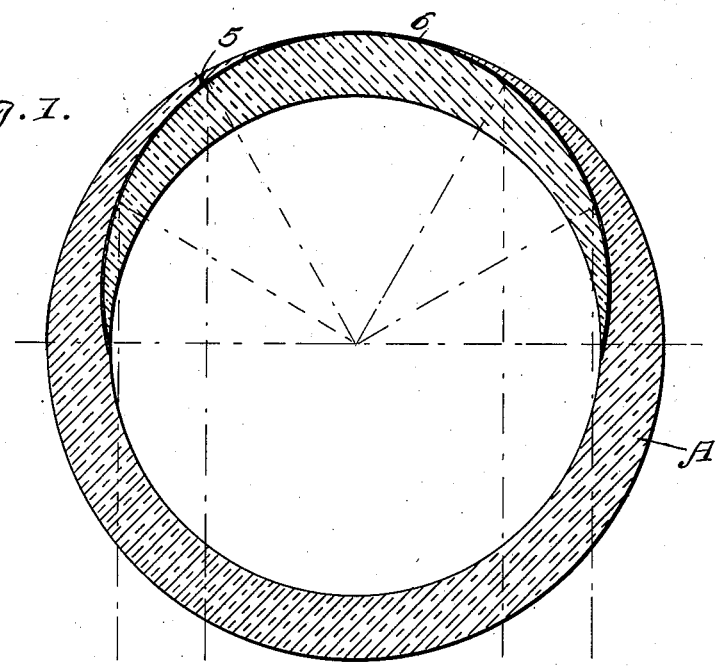
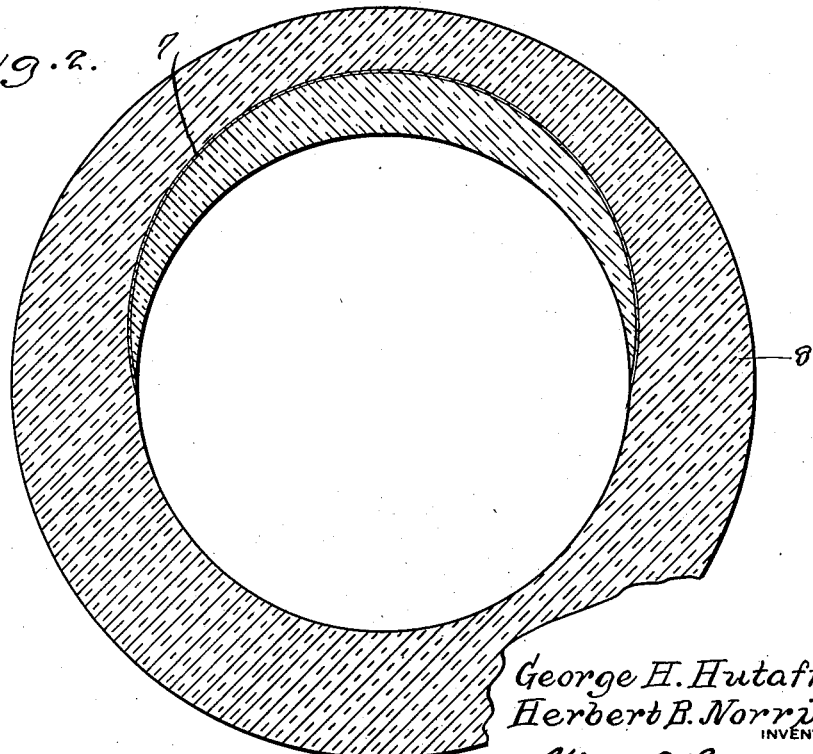
George H. Hutaff, Jr.
Herbert B. Norris
INVENTOR
BY Victor J. Evans & Co.
ATTORNEY Patented Dec. 15, 1936

2,063,929

UNITED STATES PATENT OFFICE 2,063,929

MIRRORED ELECTRIC LIGHT TUBING

George H. Hutaff, Jr., Wilmington, and
Herbert B. Norris, Raleigh, N. C.

Application June 28, 1935, Serial No. 28,934

2 Claims. (Cl. 176—122)

The invention relates to a mirrored electric light tubing and more especially to a parabolic mirror for "neon" gas and mercury vapor arc sign tubing.

The primary object of the invention is the provision of a tubing of this character, wherein the parabolic mirror will function to reflect the light rays and to concentrate such rays so as to assure a sharp lighting effect and this assuring a greater portion of the "neon" light on the eyes of all persons and the penetrating of the light through fog or smoke for a greater distance than the present day equipment.

Another object of the invention is the provision of a tubing of this character, wherein the same due to the parabolic mirror present therein reflects the sun light during day time without electric illumination of the tubing and if such tubing is electrically lighted the same when employed in a sign will render the latter much easier to read in that aid is had by the reflection of the sun light upon the mirror.

A further object of the invention is the provision of a tubing of this character, wherein damage to the back of the mirror is entirely eliminated and in this repair to the tubing when used in signs or the like is reduced to a minimum.

A still further object of the invention is the provision of a tubing of this character, which is comparatively simple in construction, thoroughly reliable and efficient in its operation, effective for attracting the attention of the public when employed in signs or the like for display purposes, strong, durable and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is a vertical transverse sectional view through a tubing constructed in accordance with the invention.

Figure 2 is a similar view showing a slight modification.

Similar reference characters indicate corresponding parts throughout the several views in the drawing.

Referring to the drawing in detail, A designates generally a portion of a glass tubing employed for electric lighting purposes, as for example a "neon" gas and mercury vapor arc sign tubing.

Within the tubing A is cast a mirror 5, parabolic in kind and disposed to have the medial portion 6 thereof meet the outer surface of the tubing A and the purpose of this parabolic mirror is to reflect the light rays emanating from a focal point into parallel rays and such tubing A carrying the mirror 5 will be bent into various letters or shapes for advertising signs in substitute for the present day "neon" signs.

In Figure 2 of the drawing there is shown a slight modification, wherein the mirror 7 is cast into the tubing 8 to be positioned within the latter considerably removed from the outer surface of the tubing and this parabolic mirror concentrates a greater portion of the light to give sharpness thereto and for maximum penetrating purposes especially when the tubing under the electric lighting of the same will penetrate fog, mist and smoke to a greater distance than the present day type of "neon" tubing. The mirrors 5 and 7 when the tubing is unlighted will reflect the sun light during day time and should the tubing be electrically lighted the same when used as a sign will be rendered easier to read because it is aided by the reflection of the sun light upon the mirror.

The tubing having embedded therein the parabolic mirror is useful in signs for illuminating purposes and will materially increase the sharpness of the illumination and assure concentration of the light for the easy reading of the sign with resultant maximum clearness thereof, either when illuminated or not. The areas of the tubing forwardly of the polished metal surfaces constituting the mirrors 5 and 7 effect lenses backed by the said mirrors as will be apparent from Figures 1 and 2 of the drawing.

What is claimed is:

1. The combination of an electric light glass tubing and a lensed mirror disposed within the tubing for concentrating and rendering a sharpness to light from within the tubing, the inner and outer surfaces of the tubing being circular with the inner surface of said lensed mirror lying flush with said inner surface of the tubing.

2. The combination of an electric light glass tubing and a lensed mirror disposed within the tubing for concentrating and rendering a sharpness to light from within the tubing, the inner and outer surfaces of the tubing being circular with the inner surface of said lensed mirror lying flush with said inner surface of the tubing, and further the said lensed mirror having its disposition wholly within the tubing and concentric to its axis.

GEORGE H. HUTAFF, JR.
HERBERT B. NORRIS.